(12) United States Patent
Choi et al.

(10) Patent No.: US 8,659,181 B2
(45) Date of Patent: Feb. 25, 2014

(54) POWER LINE COMMUNICATION METHOD FOR TRANSMITTING DATA SIGNAL WITH SPLITTING OF POWER TRANSMISSION INTERVAL

(76) Inventors: In Sook Choi, Gwangmyeong-si (KR); Hee Soo Kim, Seoul (KR); Young Kyu Lee, Yongin-si (KR)

( * ) Notice: Subject to any disclaimer, the term of this patent is extended or adjusted under 35 U.S.C. 154(b) by 416 days.

(21) Appl. No.: 12/955,587

(22) Filed: Nov. 29, 2010

(65) Prior Publication Data

US 2011/0222595 A1 Sep. 15, 2011

(30) Foreign Application Priority Data

Mar. 10, 2010 (KR) .................. 10-2010-0021149

(51) Int. Cl.
*H02J 1/00* (2006.01)
(52) U.S. Cl.
USPC ................ 307/1; 375/238; 340/538; 364/133
(58) Field of Classification Search
USPC ................ 307/1; 375/238; 340/538; 364/133
See application file for complete search history.

(56) References Cited

U.S. PATENT DOCUMENTS

| | | | |
|---|---|---|---|
| 5,003,457 A * | 3/1991 | Ikei et al. ........................ 700/4 |
| 6,278,357 B1 * | 8/2001 | Croushore et al. ............ 375/259 |
| 6,288,632 B1 * | 9/2001 | Hoctor et al. ................. 375/130 |
| 2010/0214082 A1 * | 8/2010 | Covaro et al. ............ 340/310.12 |

FOREIGN PATENT DOCUMENTS

| KR | 10-2002-0085644 A | 11/2002 |
|---|---|---|
| KR | 10-2008-0099124 A | 11/2008 |

OTHER PUBLICATIONS

KIPO Office Action for Korean Patent Application No. 10-2010-0021149 which corresponds to U.S. Appl. No. 12/955,587.
SIPO Office Action for Chinese Patent Application No. 201010582692.7 which corresponds to the above-identified application.

* cited by examiner

*Primary Examiner* — Jared Fureman
*Assistant Examiner* — Alfonso Perez Borroto
(74) *Attorney, Agent, or Firm* — LRK Patent Law Firm

(57) ABSTRACT

A power line communication method is provided, which divides the entire interval for transmitting power and data signals into a power transmission interval and a data transmission interval, and carries one or a plurality of data signals at the data transmission interval in the divided intervals.

5 Claims, 10 Drawing Sheets

POWER LINE COMMUNICATION METHOD FOR TRANSMITTING DATA SIGNAL WITH SPLITTING OF POWER TRANSMISSION INTERVAL

CROSS-REFERENCE TO RELATED APPLICATION

This application claims the benefit under 35 U.S.C. 119(a) of Korean Patent Application No. 10-2010-0021149, filed on Mar. 10, 2010, the entire disclosure of which is incorporated herein by reference for all purposes.

BACKGROUND OF THE INVENTION

1. Field of the Invention

The present invention relates to a power line communication method for transmitting data signal with splitting of power transmission interval, particularly a power line communication method for transmitting power and data signals by splitting the entire interval for transmitting power and data signals into a power transmission interval and a data transmission interval.

2. Description of the Related Art

Power lines are equipments installed to supply power and their main objective is to supply power. Power line communication is carrying data signals on the voltage of power lines.

FIG. 1 is a waveform diagram illustrating the principle of power line communication of the related art.

As shown in FIG. 1, a power line communication carries data signals of low voltage having a frequency within several KHz~several MHz on high AC voltage having a nominal frequency (60 Hz or 50 Hz for each country). Power line communication using an AC power line has several problems, such as attenuating data signals during transmitting the communication data signals through a transformer increasing or decreasing voltage in the AC power grid. It is one of the critical problems that errors occur in the communication data due to influence on the communication data from electrical noise signals generated from the load electric devices connected to the power lines.

Recently, power circuits that rapidly switch voltage ON and OFF have been widely used in electric products with development of power semiconductors; however, the electrical noise generated from switching the voltage influences the communication data at low voltage in the power line communication, which makes the problem worse.

Although power line communication using DC power lines is used when DC power grids are installed in predetermined sections, this communication also uses a method of carrying communication data signals at low voltage having a high frequency within several KHz~several MHz on DC voltage, similar to the power line communication using AC power lines.

Although the DC power line communication does not attenuate the communication data signals through a transformer, as compared with when using the AC power lines, because it does not use a transformer, the electric noises generated from the load electric device connected to the DC power lines causes the same problems described above in the communication data signals, such that it has also a limit in use. The voltage magnitude of the electric noises influence the communication data signals at low voltage, such that the data signals are adjusted larger than the magnitude of the electric noises to reduce the influence due to the electric noises; however, it changes the amount of power to supply, such that this method is also necessarily limitative. Therefore, the power line communication of the related art has a problem in that data signals are influenced by the electric noises generated from the load electric devices and the transmitted data is lost, regardless of whether to use AC power lines or DC power lines.

SUMMARY OF THE INVENTION

It is an object of the present invention to provide a power line communication method for transmitting data signals with splitting of power transmission interval in order that power line communication data signals are not influenced by electric noises generated by electric devices. The method divides the entire interval for transmitting power and data into a power transmission interval where power is supplied to a load and a data transmission interval where power from the power supply to the load is disconnected, in pulse width modulation or pulse frequency modulation for controlling power supplied from the power supply to the load, and can minimize influence due to noises generated in transmitting power by transmitting data signals at the interval where the power is disconnected or becomes "Low". The method makes it possible to prevent the influence from the electric noises by increasing the voltage magnitude of the data signals, without changing the power supplied from the power supply to the load.

An aspect of the present invention provides a power line communication method, which divides the entire interval into a power transmission interval where power is supplied to a load and a data transmission interval where power from a power supply to the load is disconnected, in pulse width modulation or pulse frequency modulation for controlling power supplied from the power supply to one or a plurality of loads, and carries one or a plurality of data signals at the data transmission interval in the divided intervals.

Further, in the power line communication method according to the present invention, the power transmitted at the power transmission interval or the transmission power of the data signal transmitted at the data transmission interval is controlled such that an average power supplied from the power supply to the load is maintained at a predetermined level for one cycle or a plurality of cycles.

Further, in the power line communication method according to the present invention, the magnitude of the one or a plurality of data signals transmitted at the data transmission interval is smaller than the magnitude of smoothed voltage or current of the load.

Further, in the power line communication method by the present invention, when the magnitude of one or a plurality of data signals transmitted at an interval, where the power line is disconnected from the power supply or the voltage is "Low", is larger than the magnitude of smoothed voltage of the load, the average power supplied from the power supply including the data signals is controlled at a predetermined voltage level for one cycle or a plurality of cycles.

Further, the power line communication method according to the present invention can control the average power supplied from the power supply to the load.

Further, a power line communication method according to the present invention divides an interval into a power transmission interval where power is supplied to a load and a data transmission interval where power from a power supply to the load is disconnected, in pulse width modulation or pulse frequency modulation for controlling power supplied from the power supply to one or a plurality of loads, and carries one or a plurality of data signals at the data transmission interval in the divided intervals, between the loads.

In an embodiment of the present invention, it is possible to increase the voltage magnitude of data signals and reduce errors in data transmission due to electric noises, without changing the average voltage supplied to the load, by dividing the entire power transmission interval into a power transmission interval and a data transmission interval, and by transmitting the data signals at the interval where power is disconnected or becomes "Low".

Further the power line communication method according to the present invention has the advantage of variably controlling the power supplied to the loads, as compared with the existing methods, by using pulse width modulation or pulse frequency modulation.

Further, since the switching frequency of the pulse modulation is high at several tens kHz, the data transmission interval is rapidly repeated and a rapid data transmission cycles can be achieved, as compared with the existing methods, such that it can be applied to the field requiring real-time control, such as a motor control system.

Further, it is very easy to perform synchronization in communicating data signals, because it is possible to transmit power and data signals, using the pulse width or pulse frequency modulation.

DETAILED DESCRIPTION OF THE PREFERRED EMBODIMENTS

Figure 1:
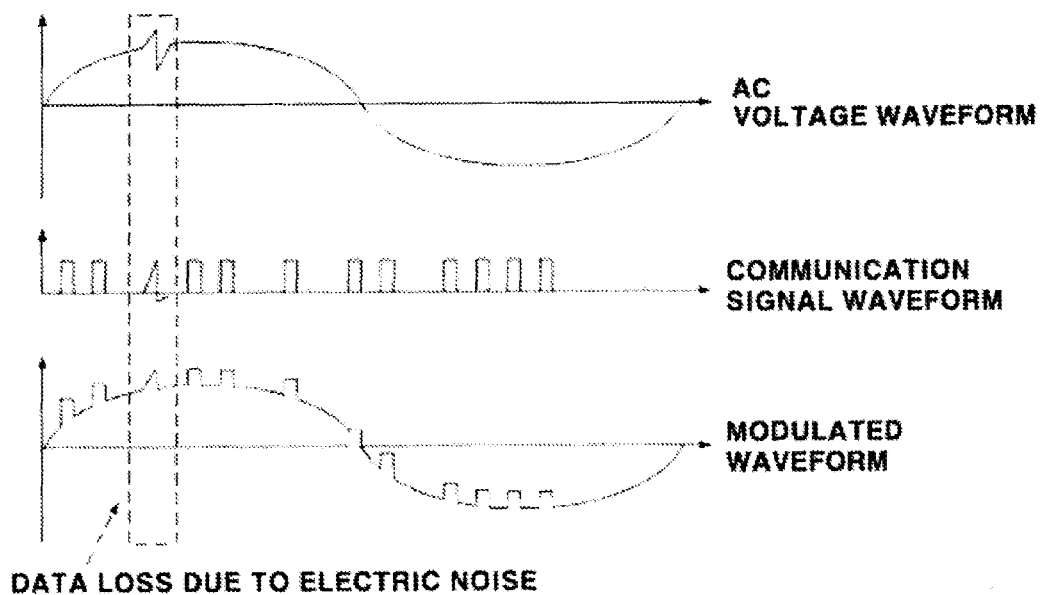
FIG. 1 is a waveform diagram of power line communication of the related art.

Although the present invention can be modified variously and have several embodiments, the exemplary embodiments are illustrated in the accompanying drawings and will be described in detail in the detailed description. However, the present invention is not limited to the specific embodiments and should be construed as including all the changes, equivalents, and substitutions included in the spirit and scope of the present invention.

A power line communication method for transmitting data signals at split power transmission intervals according to embodiments of the present invention is described with reference to the accompanying drawings, and the same or corresponding components are given the same reference numerals, regardless of the figures, and repetitive description is not provided.

Figure 2:
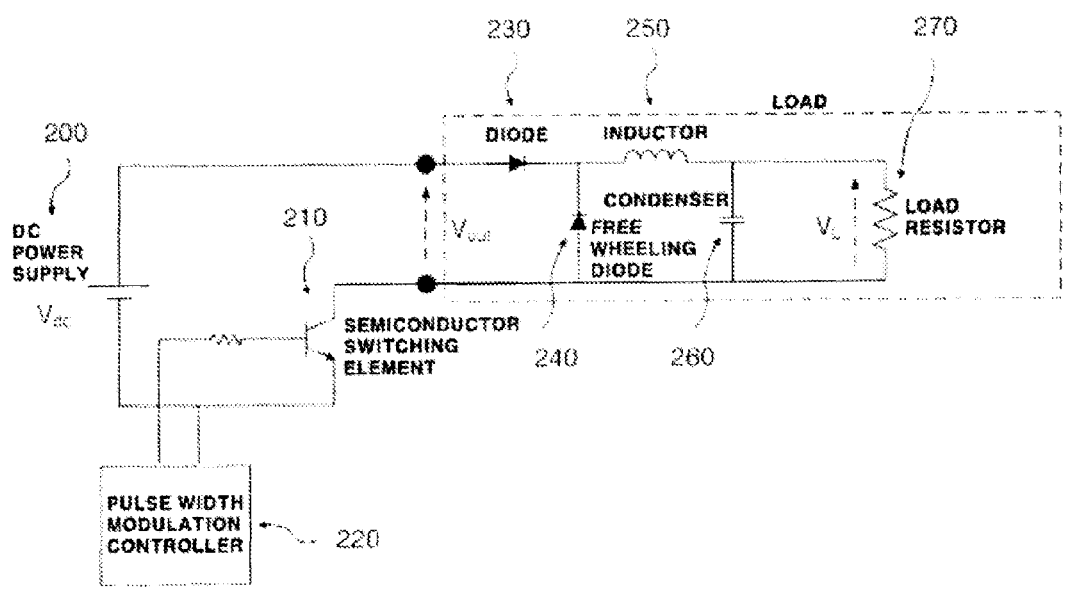
FIG. 2 is a diagram showing a circuit supplying power to loads in common pulse width modulation.
Figure 3:
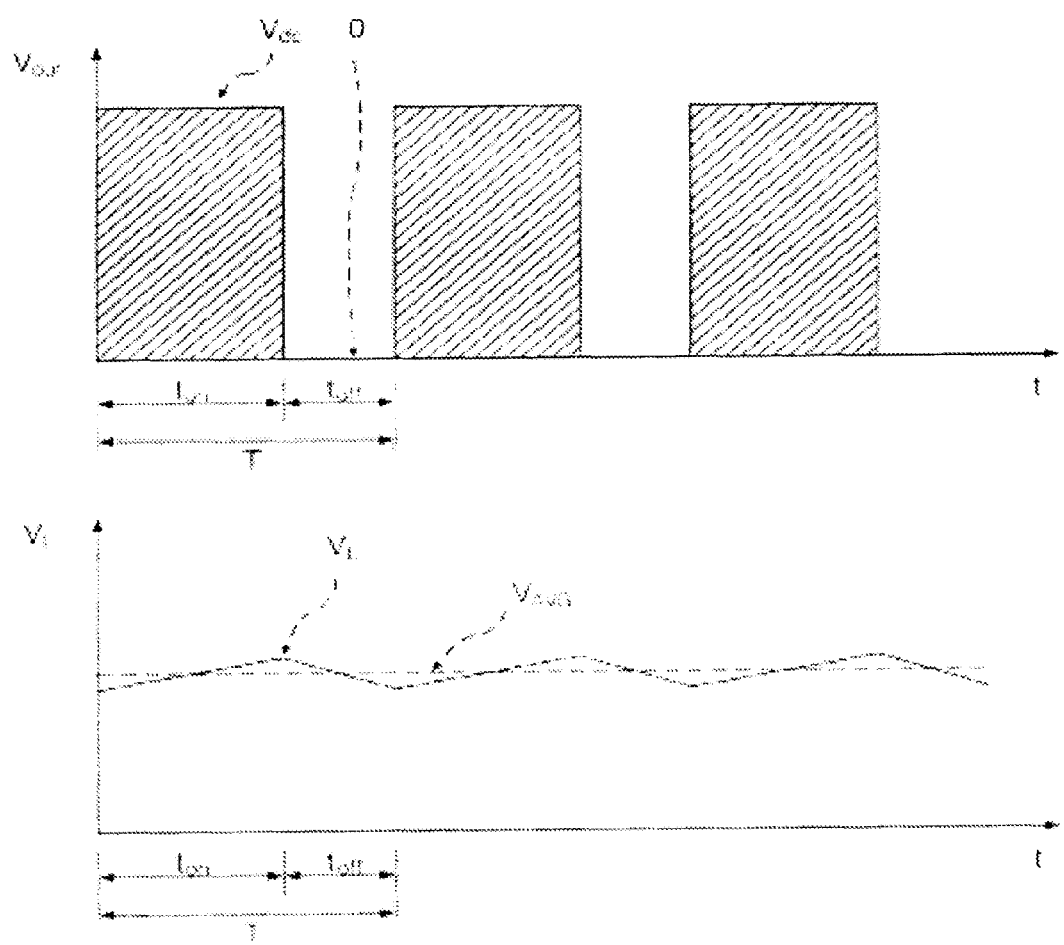
FIG. 3 is a diagram showing a waveform of common pulse width modulation and a waveform of voltage transmitted to loads.

FIG. 2 is a diagram showing a circuit supplying power to loads in common pulse width modulation and FIG. 3 is a diagram showing a waveform of common pulse width modulation and a waveform of voltage transmitted to loads.

As shown in FIGS. 2 and 3, DC voltage Vdc generated from a DC power supply 200 switches a semiconductor switching element 210 such that pulse voltage is transmitted to loads, in response to a control signal from a pulse width modulation controller 220.

The voltage transmitted to the loads is transmitted to a load resistor 270 while slight increasing/decreasing from average voltage Vavg of the pulse voltage through the ON/OFF intervals of the semiconductor switching element 210.

The power transmitted to the loads may use a common sine wave, may use a modulating wave generated by pulse width modulation or pulse frequency modulation, and the voltage or the current of the power supply may be direct or alternating voltage or current, or voltage or current where direct and alternating current or voltage is mixed.

Figure 4:
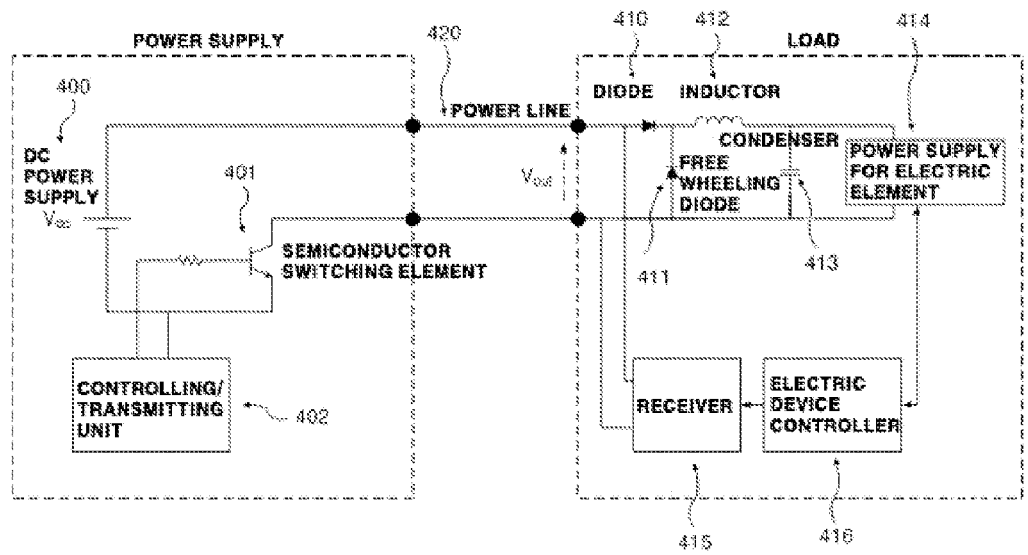
FIG. 4 is a diagram illustrating the configuration of a circuit according to a first embodiment for illustrating power line communication transmitting data signals at split power transmission intervals of the present invention.
Figure 5:
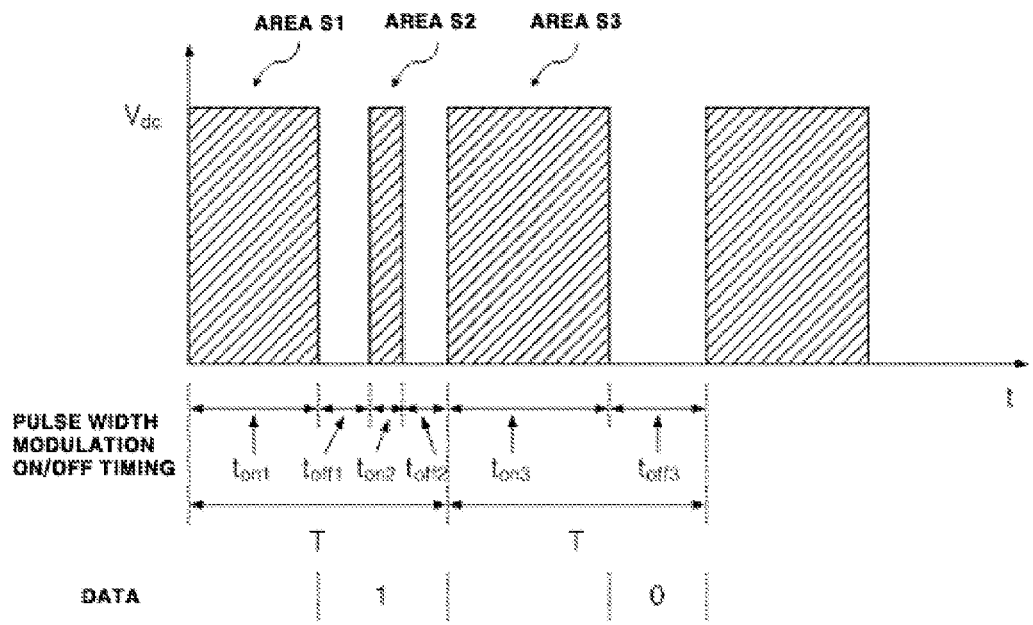
FIG. 5 is a diagram showing a voltage waveform including communication data signals of the first embodiment, according to the power line communication transmitting data signals at split power transmission intervals of the present invention.

FIG. 4 is a diagram illustrating the configuration of a circuit according to a first embodiment for illustrating power line communication transmitting data signals at split power transmission intervals of the present invention and FIG. 5 is a diagram showing a voltage waveform including communication data signals of the first embodiment, according to the power line communication transmitting data signals at split power transmission intervals of the present invention.

As shown in FIG. 4, a circuit for illustrating power line communication method for transmitting data signals at split power transmission intervals according to the first embodiment of the present invention is composed of a power-sided circuit and a load-sided circuit.

The power-sided circuit includes a semiconductor switching element 401 that switched to connect or disconnect a power line 420 and a DC power supply 400, and a controlling/transmitting unit 402 that controls the semiconductor switching element 401 in pulse width modulation.

The load-sided circuit includes: a diode 410 connected with the power line 420 to be supplied with current to the load from the DC power supply 400 and prevent current from reversely flowing; a low-pass filter composed of a condenser 413 and an inductor 412 connected to the cathode terminal of the diode 410 to smooth voltage; a power supply unit 414 for electric devices which is connected to the output terminal of the low-pass filter; a free-wheeling diode 411 connected between the cathode terminal of the diode 410 and the ground of the power supply unit 414 for load electric devices to return the current; a receiver connected between the anode terminal of the diode 410 and the ground of the power supply unit for load electric devices; and an electric device controller 416 controlling the electric devices in response to communication data signals from the receiver 415, in which the receiver 415 of the load-sided circuit receives communication data from voltage signals transmitted to the load.

The voltage waveform shown in FIG. 5 shows a waveform of the Vout terminal measured before passing the low-pass filter using the inductor 412 and the condenser 413 of the load. The power line communication method for transmitting data signals at split power transmission intervals according to the first embodiment of the present invention turns on the semiconductor switching element 401 during the "ton2" interval in the intervals where the pulse voltage is "Low" in the cycle T of the pulse voltage such that a data signal "1" is transmitted to the load.

In this case, when the data signal is "0", the semiconductor switching element 401 is kept "OFF" during the "toff3" interval.

The power line communication method according to the present invention splits the entire interval where power and data signals are transmitted from the power supply to the load in to a power transmission interval and a data transmission interval, and carries one or a plurality of data signals in the data transmission interval where power is disconnected, in the split intervals, thereby keeping the average value or the root mean square value of the power supplied to the load.

The average value of the power supplied to the load is a value obtained by integrating the voltage or current supplied for one cycle and dividing it by the cycle T, and in FIG. 5, when the ton1 and ton2 are controlled such that the sum becomes the ton3, the sum of the area s1 and the area S2 become the area S3; therefore, the average voltage transmitted to the load can be maintained at a predetermined level while the data signal 1 is carried or the data signal 0 is carried.

In the first embodiment according to the present invention, although only one data signal is transmitted for one cycle, a plurality of data signals can be carried and transmitted for one cycle. Further, it is possible to perform the power line communication while controlling the average power or the root mean square power transmitted to the load not for one cycle, but for a plurality of cycles, at a predetermined level, in the same method.

Figure 6:
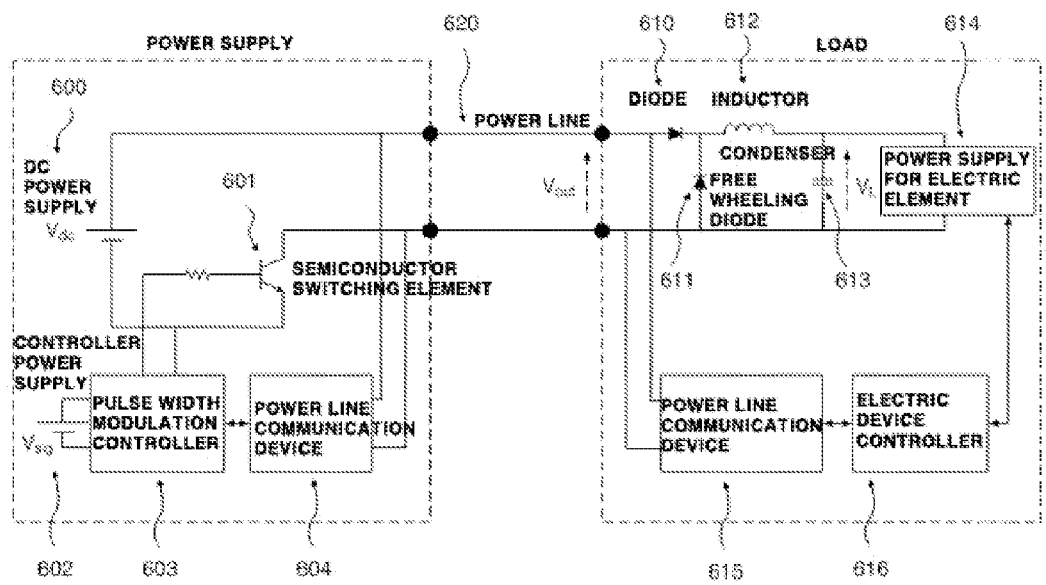
FIG. 6 is a diagram illustrating the configuration of a circuit according to a second embodiment for illustrating power line communication transmitting data signals at split power transmission intervals of the present invention.
Figure 7:
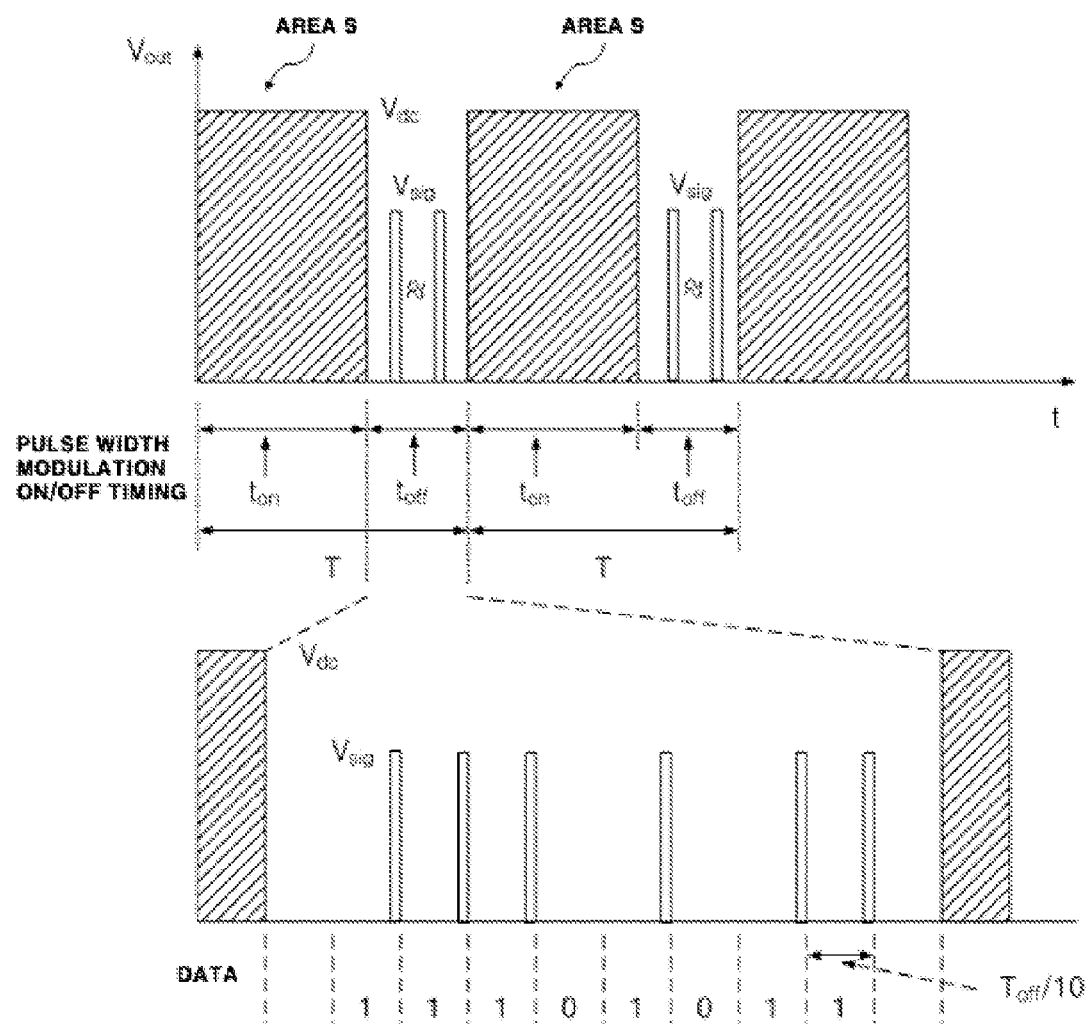
FIG. 7 is a diagram showing a voltage waveform including communication data signals of the second embodiment, according to the power line communication transmitting data signals at split power transmission intervals of the present invention.

FIG. 6 is a diagram illustrating the configuration of a circuit according to a second embodiment for illustrating power line communication transmitting data signals at split power transmission intervals of the present invention and FIG. 7 is a diagram showing a voltage waveform including communication data signals of the second embodiment, according to the power line communication transmitting data signals at split power transmission intervals of the present invention.

As shown in FIG. 6, a circuit for illustrating power line communication method for transmitting data signals at split power transmission intervals according to the second embodiment of the present invention is composed of a power-sided circuit and a load-sided circuit.

The power-sided circuit includes a DC power supply 600, a semiconductor switching element 601, a controller power supply 602, a pulse width modulation controller 603, and a power line communication device 604.

The controller power supply 602 supplies power to the power line communication device 604 and the pulse width modulation controller 603 and the pulse width modulation controller 603 can change the width of the waveform of voltage of current supplied from the DC power supply 600 by turning on/off the semiconductor switching element 601 that connects/disconnects the DC power supply 600 and the power line 620.

The power line communication device 604 is connected with the pulse width modulation controller 603 and communicates power communication signals with the power line 620.

The load-sided circuit includes a diode 610, a free wheeling diode 611, an inductor 612, a condenser 613, a power supply unit 614 for electric devices, a power line communication device 615, and the electric device controller 616.

The diode 610 is connected to the power line 620 to transmit power supplied from the power supply and prevent current from reversely flowing, and a low-pass filter composed of the inductor 612 and the condenser 613 is connected to the cathode terminal of the diode 610 to smooth voltage.

The power supply unit 614 for electric devices is connected to the output terminal of the low-pass filter and the free wheeling diode 611 is connected between the cathode terminal of the diode 610 and the ground of the power supply unit 614 for load electric devices to return the current.

The power line communication device 615 is connected between the anode terminal of the diode 610 and the ground of the power supply unit 614 for load electric devices and the electric device controller 616 controls the electric devices in response to data transmitted through the power line communication device 615.

In the circuit shown in FIG. 6, when the DC power supply 600 is switched by the semiconductor switching element 601, the interval toff where power is disconnected from the DC power supply 600 Vdc of the power supply side, and the power line communication device 604 can carry a plurality of data signals on the power line 620 by dividing the toff time into predetermined intervals, and applying Vsig voltage when the data signal is 1 in each interval or not applying the voltage Vsig when the data signal is 0, in order to carrying communication data on the power line 620.

As shown in FIG. 7, the data transmission interval toff where the power is disconnected is divided in to 10 intervals, in which data signals can be transmitted by defining the first and the last intervals as margin intervals for preventing noises, and applying the Vsig voltage to transmit the data signal "1" and disconnecting the Vsig voltage to transmit the data signal "0" in the second to ninth intervals.

The data transmission interval toff can be divided by various methods and intervals, and the current by the data signals does not flow to the load, when the magnitude Vsig of the data signals is lower than the smoothed voltage VL of the load.

That is, the Vsig voltage can freely have a large voltage value as long as it is lower than the smoothed voltage of the load, such that it can be less influenced by the electric noise signals on the power line and does not influence the amount of power supplied to the load.

Further, it is possible to perform the power line communication while maintaining the average value or the root mean square value of the supplied power by controlling the sum of the areas of the data signal waveforms for one cycle and the sum of the areas for the ton interval at a predetermined level, even if the Vsig voltage is larger than the smoothed voltage.

The waveform of the transmitted data signals is shown at the Vout terminal before passing through the low-pass filter using the inductor 612 and the condenser 613 of the load, such that it is possible to receive the data signals by connecting the power line communication device 615 of the load for receiving the data to the Vout terminal. Further, the communication data transmitted to the power line communication device 615 can be received by the electric device controller 616 to control the electric devices.

It is possible to transmit communication data from the power supply to the load and to transmit data to the power supply from the load which is opposite direction in the data transmission interval toff where power (power or current) supplied from the power supply is disconnected, in the method described above; therefore, it is possible to perform bi-directional communication of data signals, using the power line.

That is, it is possible to transmit condition information of the electric devices from the load to the power supply, using the data transmission interval where the power is disconnected. Further, it is possible to communicate data between a plurality of loads connected to the power line, using the data transmission interval where the power is disconnected.

In FIGS. 4 and 6 which are described above, it is possible to apply the principle of the present invention, even if pulse frequency modulation is used, instead of the pulse width modulation, because there is an interval where voltage or current is Low or an interval where power is disconnected.

Further, since there is an interval where voltage or current is Low even in sine pulse width modulation used for an inverter, the principle of the present invention can be used.

Further, since the switching frequency of the pulse modulation is high at several tens kHz, the data transmission interval is rapidly repeated and a rapid data transmission cycles can be achieved, as compared with the existing methods, such that it can be applied to the field requiring real-time control, such as a motor control system.

Further, since the pulse width modulation or the pulse frequency modulation is used, the power line communication method of the present invention can variably control the power supplied to the load.

Figure 11:
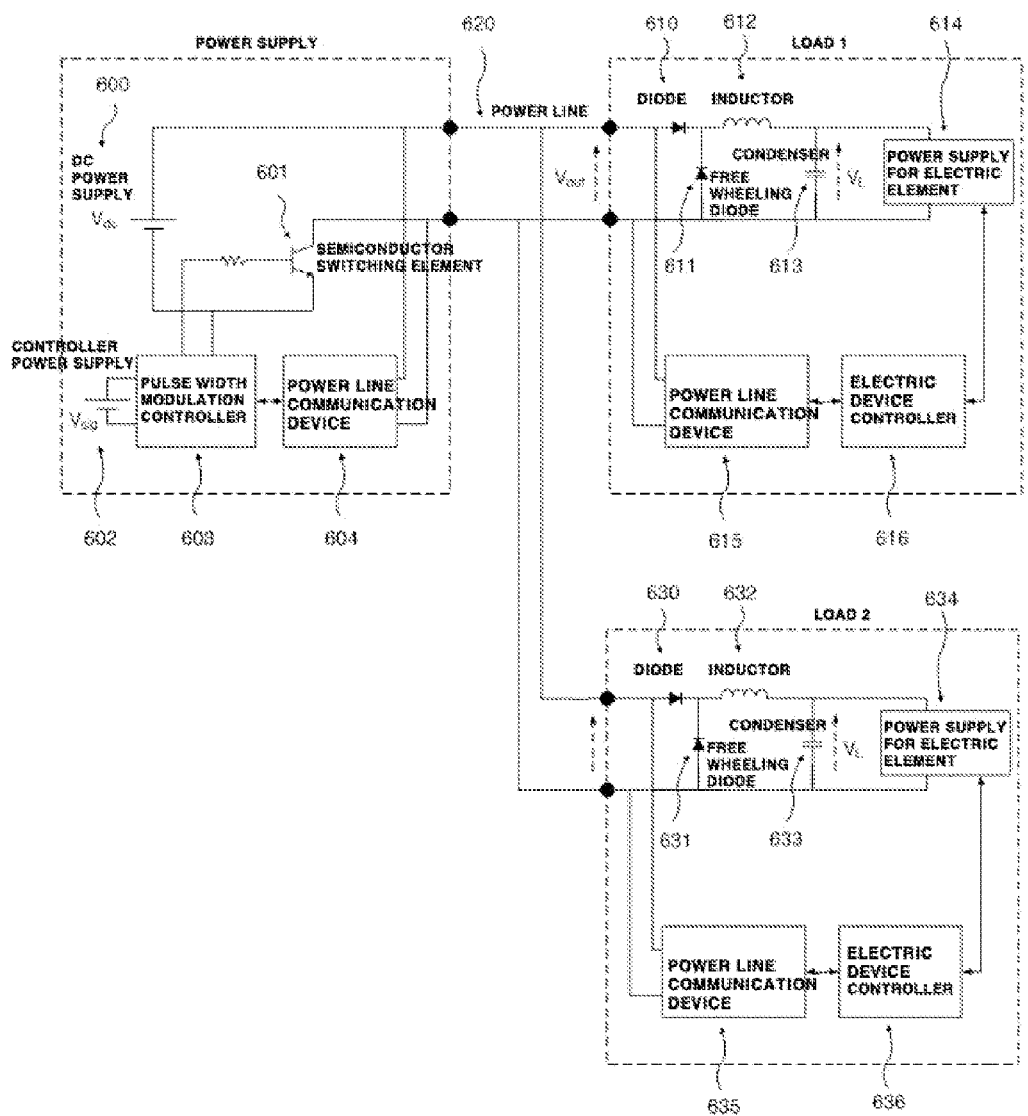
FIG. 11 is a diagram illustrating the configuration of a circuit for power line communication between loads in the second embodiment, according to the power line communication transmitting data signals at split power transmission intervals of the present invention.

Further, it is possible to communicate data between the loads by the power line communication method of the present invention. FIG. 11 is a diagram illustrating the configuration of a circuit for power line communication between loads in the second embodiment, according to the power line communication transmitting data signals at split power transmission intervals of the present invention. In FIG. 11, one load is additionally connected in parallel to the power line in comparison with FIG. 6, in which the number of loads connected in parallel can be freely increased. In this case, it is possible to communicate data between the loads at the data transmission terminal where power is disconnected from the power supply to the loads, in the method described above, through the power line between the load 1 and the load 2.

Figure 8:
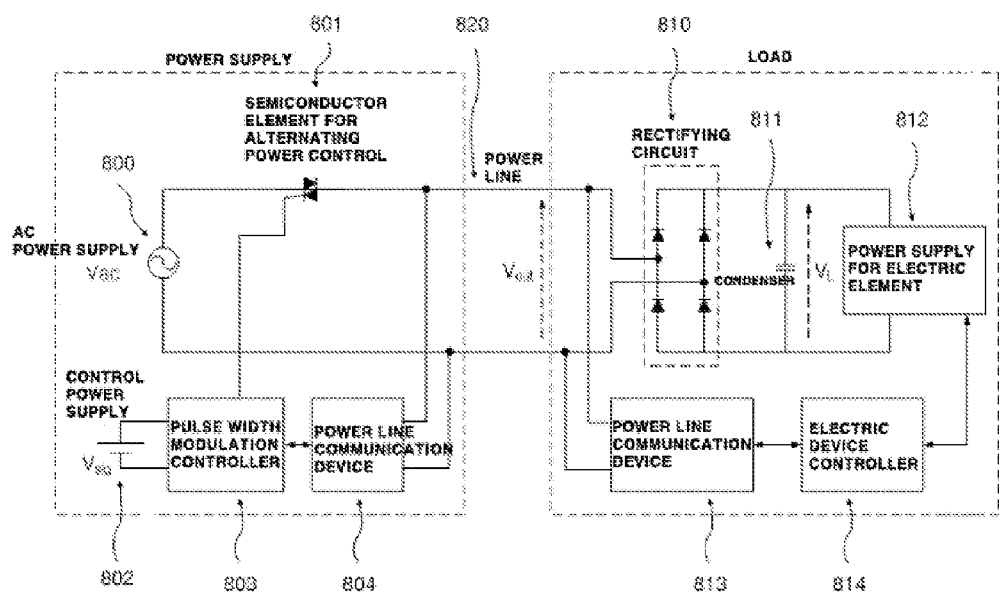
FIG. 8 is a diagram illustrating the configuration of a circuit according to a third embodiment for illustrating power line communication transmitting data signals at split power transmission intervals of the present invention.
Figure 9:
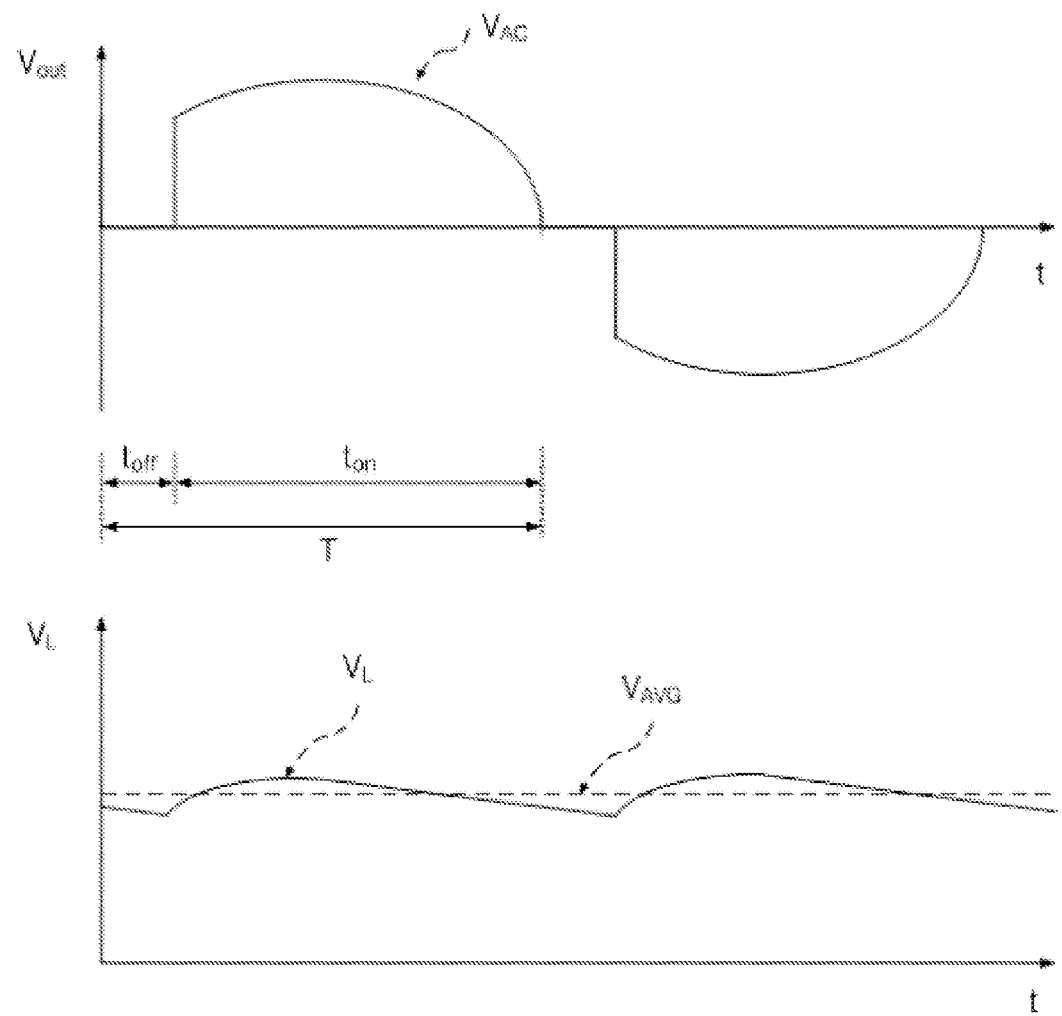
FIG. 9 is a diagram showing a voltage waveform not including communication data signals of the third embodiment, according to the power line communication transmitting data signals at split power transmission intervals of the present invention.
Figure 10:
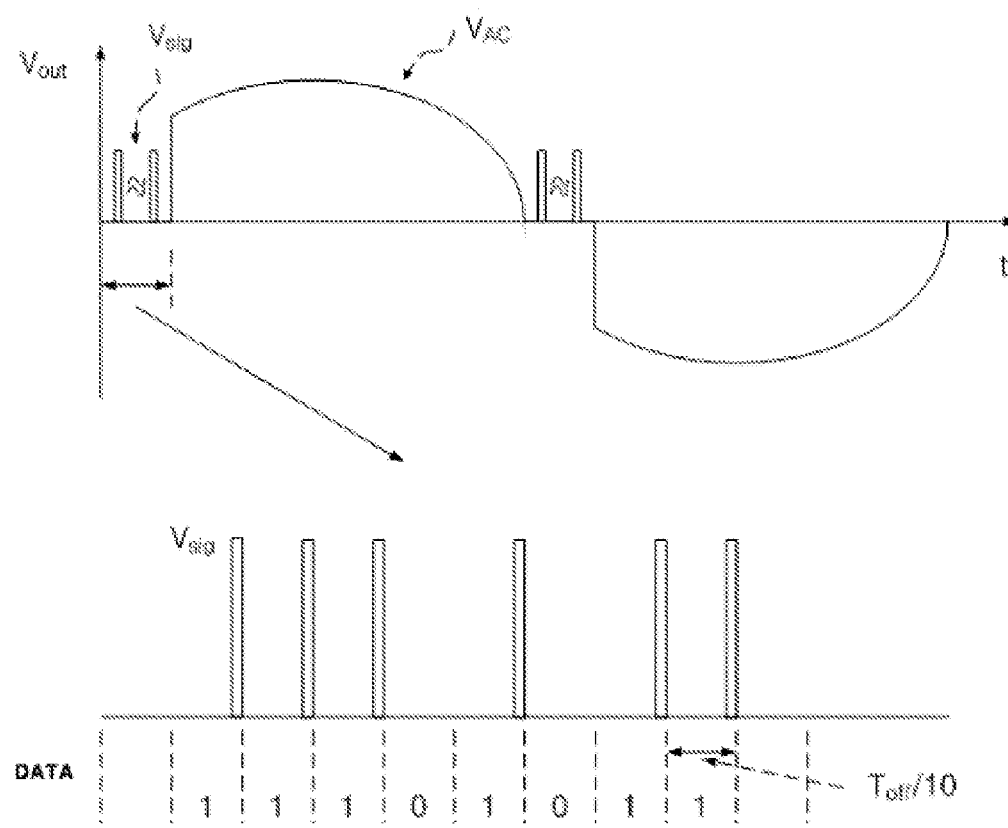
FIG. 10 is a diagram showing a voltage waveform including communication data signals of the third embodiment, according to the power line communication transmitting data signals at split power transmission intervals of the present invention.

FIG. 8 is a diagram illustrating the configuration of a circuit according to a third embodiment for illustrating power line communication transmitting data signals at split power transmission intervals of the present invention, FIG. 9 is a diagram showing a voltage waveform not including communication data signals of the third embodiment, according to the power line communication transmitting data signals at split power transmission intervals of the present invention, and FIG. 10 is a diagram showing a voltage waveform including communication data signals of the third embodiment, according to the power line communication transmitting data signals at split power transmission intervals of the present invention.

As shown in FIG. 8, the configuration of a circuit according to a third embodiment for illustrating power line communication transmitting data signals at split power transmission intervals of the present invention is similar to the configuration of the second embodiment shown in FIG. 6, in which it is different that the semiconductor switching element 601 of the power-sided circuit is replaced by a semiconductor element 801 for controlling alternating current, and the diode 601 and the free wheeling diode 611 of the load-sided circuit are replaced by a rectifying circuit 810.

The semiconductor element 801 for controlling alternating current connects/disconnects an AC power supply 800 and a power line 820 and the rectifying circuit 810 is connected to the power line 820 and generates and supplies DC voltage to the electric devices of the load from the AC power supply 800, which is a difference.

As shown in FIG. 9, the power line 820 is disconnected from the AC power supply 800 of the power at the interval toff where voltage is "Low" during one cycle T, which is a data transmission interval. A power line communication device 804 can carry a plurality of data signals on the power line 820 by dividing the data transmission interval toff into predetermined intervals, and applying Vsig voltage when the data signal is "1" or not applying the Vsig voltage when the data signal is "0", as shown in FIG. 10, in order to carry the data signals on the power line at the data transmission interval toff.

As shown in FIG. 10, it is possible to equally divide the data transmission interval toff into 10 intervals, and define the first and the last intervals as margin intervals for preventing noises, and transmit data signals for the second to ninth intervals. In this configuration, the data transmission interval toff can be divided in various numbers and cycles.

Since the current due to the data signals are not transmitted to the load, when the magnitude Vsig of the data signals is smaller than the smoothed voltage VL of the load, the magnitude Vsig of the data signals can be freely determined unless it exceeds the smoothed voltage of the load, such that it is less influenced by the electric noise signals generated in the power line and the amount of power supplied to the load is not influenced. Therefore, it is possible to perform the power line communication while maintaining the average value or the root mean square value of the voltage supplied in the pulse width modulation to an existing circuit.

As shown in FIG. 8, the load receives communication data through the power line communication device 813 for receiving the data at the Vout terminal before the waveform of the transmitted data passes through the rectifying circuit.

Further, the communication data transmitted to the power line communication device 813 can be received by the electric device controller 814 to control the electric devices.

It may be possible to transmit communication data from the power supply to the load in the method described above, or it may be possible to transmit data from the load to the power supply, in the opposite direction, at the interval toff where voltage is "Low" in the same method, such that it is possible to perform bi-directional communication, using a power line. Further, it is possible to communicate data between a plurality of loads connected to the power line, using the data transmission interval where the power is disconnected.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power line communication method, which divides an entire interval into a power transmission interval where power is supplied to a load and a data transmission interval where power from a power supply to the load is disconnected or becomes "Low", by controlling power supplied from the power supply to one or a plurality of loads by pulse width modulation method or pulse frequency modulation method, and carries one or a plurality of data signals at the data transmission interval in the divided intervals, wherein when a magnitude of the one or plurality of data signals transmitted at the data transmission interval is larger than a magnitude of smoothed voltage of the load during the power transmission interval, transmission power is controlled at a predetermined level such that an average power supplied from the power supply including the data signals is maintained at a predetermined level for one cycle or a plurality of cycles.

2. The power line communication method according to claim 1, wherein the power transmitted at the power transmission interval or the transmission power of the data signal transmitted at the data transmission interval is controlled such that an average power supplied from the power supply to the load is maintained at a predetermined level for one cycle or a plurality of cycles.

3. The power line communication method according to claim 1, wherein the magnitude of the one or plurality of data signals transmitted at the data transmission interval is smaller than the magnitude of smoothed voltage of the load.

4. The power line communication method according to claim 1, wherein the magnitude of the average power supplied, from the power supply to the load is variably controlled.

5. A power line communication method, which divides an entire interval into a power transmission interval where power is supplied to a load and a data transmission interval where power from a power supply to the load is disconnected, by controlling power supplied from the power supply to one or a plurality of loads by pulse width modulation method or pulse frequency modulation method, and carries one or a plurality of data signals at the data transmission interval in the divided intervals, among the loads, wherein when a magnitude of the one or plurality of data signals transmitted at the data transmission interval is larger than a magnitude of smoothed voltage of the load during the power transmission interval, transmission power is controlled at a predetermined level such that an average power supplied from the power supply including the data signals is maintained at a predetermined level for one cycle or a plurality of cycles.

* * * * *